(12) United States Patent
Handlin, Jr. et al.

(10) Patent No.: US 7,001,950 B2
(45) Date of Patent: Feb. 21, 2006

(54) TETRABLOCK COPOLYMER AND COMPOSITIONS CONTAINING SAME

(75) Inventors: Dale L. Handlin, Jr., Houston, TX (US); Carl L. Willis, Houston, TX (US); Lie K. Djiau, Houston, TX (US); Hector Hernandez, Houston, TX (US); Robert Dossett, Jr., Houston, TX (US)

(73) Assignee: KRATON Polymers U.S. LLC, Houston, TX (US)

(*) Notice: Subject to any disclaimer, the term of this patent is extended or adjusted under 35 U.S.C. 154(b) by 83 days.

(21) Appl. No.: 10/395,403

(22) Filed: Mar. 24, 2003

(65) Prior Publication Data

US 2003/0187137 A1 Oct. 2, 2003

Related U.S. Application Data

(60) Provisional application No. 60/368,367, filed on Mar. 28, 2002.

(51) Int. Cl.
*C08L 53/02* (2006.01)

(52) U.S. Cl. .......................................... 525/98; 525/271

(58) Field of Classification Search ................ 525/271, 525/98
See application file for complete search history.

(56) References Cited

U.S. PATENT DOCUMENTS

| | | |
|---|---|---|
| 3,149,182 A | 9/1964 | Porter |
| 3,494,942 A | 2/1970 | Miki et al. |
| RE27,145 E | 6/1971 | Jones |
| 3,595,942 A | 7/1971 | Wald et al. |
| 3,634,549 A | 1/1972 | Shaw et al. |
| 3,670,054 A | 6/1972 | De La Mare et al. |
| 3,700,633 A | 10/1972 | Wald et al. |
| 4,039,593 A | 8/1977 | Kamienski et al. |
| 4,874,821 A | 10/1989 | Agostinis et al. |
| 5,378,760 A | 1/1995 | Modic et al. |
| 5,492,967 A | 2/1996 | Djiauw et al. |
| 5,549,964 A | 8/1996 | Shohji et al. |
| 5,554,697 A | 9/1996 | Van Dijk et al. |
| 5,705,556 A | 1/1998 | Djiauw et al. |
| 5,777,031 A | 7/1998 | Djiauw et al. |
| 6,106,011 A | 8/2000 | Masubuchi et al. |
| 6,239,218 B1 * | 5/2001 | Yonezawa et al. ............ 525/98 |
| 6,458,891 B1 | 10/2002 | Yonezawa et al. |

* cited by examiner

*Primary Examiner*—Jeffrey Mullis

(57) ABSTRACT

Disclosed is a novel tetrablock copolymer having the general configuration of A1-B1-A2-B2, where the A1 and A2 blocks are mono alkenyl arene and the B1 and B2 blocks are blocks of hydrogenated butadiene, having a 1,2-vinyl content of between 25% and 60%. The blocks have well defined molecular weight ranges, resulting in a polymer having a unique set of property advantages. Also disclosed are elastomeric compositions containing the linear hydrogenated block copolymer, a styrene polymer, an ethylene polymer and a tackifying resin. These elastomeric compositions have particular utility in injection molded parts and in extruded parts such as extruded films and fibers.

21 Claims, 3 Drawing Sheets

TETRABLOCK COPOLYMER AND COMPOSITIONS CONTAINING SAME

CROSS-REFERENCE TO RELATED APPLICATION

The present application claims priority from copending, commonly assigned U.S. patent application Ser. No. 60/368,667, filed Mar. 28, 2002, entitled Novel Tetrablock Copolymer and Compositions Containing Same (W-0003 prov.).

FIELD OF THE INVENTION

The present invention relates to a novel tetrablock copolymer and to compositions containing such tetrablock copolymer. More particularly the tetrablock copolymer is a selectively hydrogenated ABAB block copolymer having a particular molecular weight distribution and microstructure, resulting in a polymer having a unique set of property advantages. Also claimed are blends of the tetrablock copolymer and other constituents including styrene polymers, olefin polymers and tackifying resins.

BACKGROUND OF THE INVENTION

The preparation of block copolymers of mono alkenyl arenes and conjugated dienes is well known. One of the first patents on linear ABA block copolymers made with styrene and butadiene is U.S. Pat. No. 3,149,182. These polymers in turn could be hydrogenated to form more stable block copolymers, such as those described in U.S. Pat. No. 3,595,942 and U.S. Pat. No. Re. 27,145. A number of other variations for block copolymer structures have been found since then. One of the types of block copolymers that has found limited utility in the past have been tetrablock copolymers having the structure ABAB or BABA, where the A block is a styrene block and the B block is a conjugated diene block, typically either an isoprene block or a butadiene block. These polymers in turn have sometimes been hydrogenated. Such tetrablock copolymers are disclosed in a variety of patents, including U.S. Pat. Nos. 4,874,821; 5,378,760; 5,492,967; 5,549,964; 5,554,697; 6,106,011; and 6,239,218.

One of the many end uses for block copolymers and tetrablock copolymers is in fibers and films. See, for example, U.S. Pat. Nos. 5,549,964 and 5,705,556. However, during film and fiber formation, breaks are a common problem for highly elastic rubber compounds. Many of the existing block copolymers and formulations based on such block copolymers continue to have problems with breaks. What is needed is a polymer and compound that possesses enhanced strength to produce tougher films and fibers that are much less likely to break during processing. In addition, highly elastic compounds have a tendency to orient during injection molding in long or complex molds. This orientation leads to warpage and non-uniform shrinkage during de-molding or heating. What is needed then is a material with good elastic properties that can be easily injection molded into a part with isotropic properties. It is also desirable to produce a polymer with a higher modulus thus providing a stiffer rubber. A stiffer, stronger rubber allows the use of less polymer to achieve a desired stretching force, and is therefore, more economical.

SUMMARY OF THE INVENTION

The inventors have discovered a linear hydrogenated block copolymer possessing a unique balance of properties. In particular, the inventors have discovered a linear hydrogenated block copolymer consisting of four alternating blocks having the block arrangement of $A_1$-$B_1$-$A_2$-$B_2$ wherein:

a. the two polymer blocks $B_1$ and $B_2$ comprise hydrogenated butadiene monomer units in which at least 90% of the olefinically unsaturated double bonds contained in the unhydrogenated polymer block are hydrogenated, and in which the unhydrogenated polymer block have a 1,2-vinyl bond content of greater than 25% and less than 60%;

b. the two polymer blocks $A_1$ and $A_2$ comprise mono alkenyl arene monomer units;

c. the number average molecular weights of the blocks are between 6,000 and 8,000 for the $A_1$ block, between 55,000 and 70,000 for the $B_1$ block, between 7,500 and 9,000 for the $A_2$ block and between 5,000 and 12,000 for the $B_2$ block; and d. wherein said linear hydrogenated block copolymer has an order-disorder temperature of less than 240° C., a melt flow rate of less than 2.0 g/10 minutes as measured at 200° C. under a load of 5 kg in accordance with ASTM D1238 and a melt flow rate of between 4.0 and 20.0 g/10 minutes as measured at 250° C. under a load of 5kg in accordance with ASTM 1238D.

The $B_1$ and $B_2$ blocks resemble ethylene/butylene copolymers due to the control of the 1,2-content of the butadiene polymer. These are therefore alternatively termed "EB" blocks.

The inventors have found that the particular combinations of molecular weights for the blocks claimed herein leads to outstanding elastic properties, and that the molecular weight of the $B_2$ block, or the "EB-tail", can be used to control the processability of the polymer.

In another aspect, the inventors have discovered that such linear hydrogenated block copolymers may be compounded with other components into certain elastomeric compositions that have great utility for injection molding and extrusion. Injection molding can be used to make articles such as overmolded handles and soft panels. Extrusion can be used to prepare films, ribbons, tapes and fibers. These compositions comprise the linear hydrogenated block copolymer, a styrene polymer, an ethylene polymer and a tackifying resin. The tetrablock copolymer of the present invention allows a balance of processability, strength and elasticity not achievable in any other film and fiber compound. Compounds for these film and fiber applications normally have strengths in the range of 2,000 to 3,000 psi. The combination of this particular tetrablock copolymer with tackifying resin, polyethylene, and polystyrene yields strengths in the range of 4,500 to 6,000 psi while retaining the balance of processability and elasticity of existing compounds. It is commonly accepted in the art that addition of commercial polystyrene to block copolymers does not affect the end-blocks of these polymers. However, the inventors have found that the addition of between 5 and 10% commercial polystyrene strikingly increases the tensile strength and modulus of these compounds, far beyond the small effect that would arise if the polystyrene were present as filler. The compounds of the present invention are much stiffer than previous compounds with comparable elasticity.

DETAILED DESCRIPTION OF THE INVENTION

Figure 1:
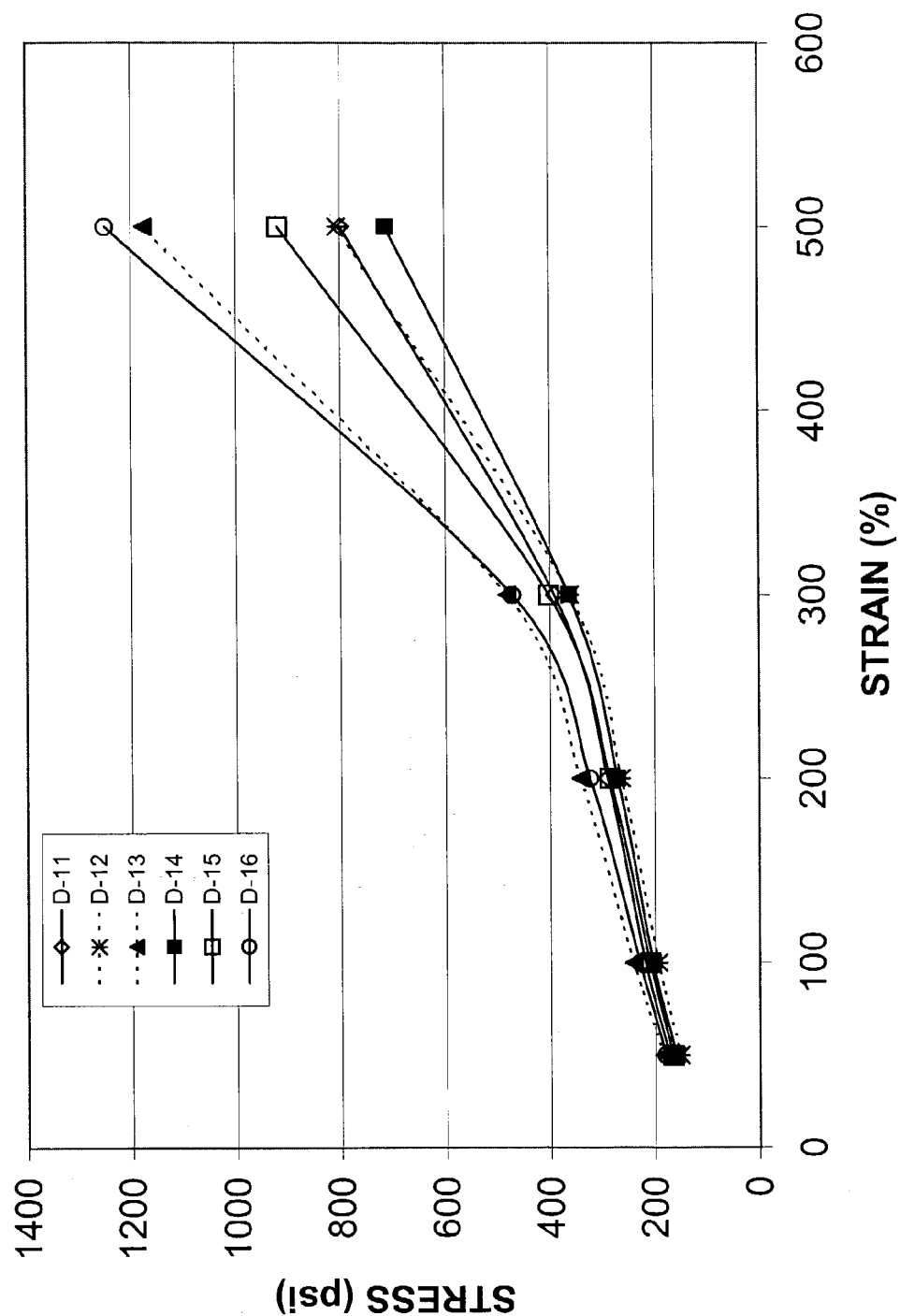
FIG. 1 shows stress-strain curves for various compounds of one of the tetrablock copolymers of the present invention with varying amounts and types of polystyrene.

The tetrablock copolymers of the present invention are linear polymers prepared by contacting the monomers to be polymerized sequentially with an organoalkali metal compound in a suitable solvent at a temperature within the range from about −150° C. to about 300° C., preferably at a temperature within the range from about 0° C. to about 100° C. Particularly effective anionic polymerization initiators are organolithium compounds having the general formula $RLi_n$ where R is an aliphatic, cycloaliphatic, aromatic, or alkyl-substituted aromatic hydrocarbon radical having from 1 to 20 carbon atoms; and n is an integer of 1 to 4. Preferred initiators include n-butyl lithium and sec-butyl lithium. See generally, U.S. Pat. Nos. 4,039,593 and U.S. Re. Pat. No. 27,145 for typical synthesis.

The tetrablock is a selectively hydrogenated $A_1$-$B_1$-$A_2$-$B_2$ block copolymer where the A blocks are polymer blocks of mono alkenyl arenes, preferably polymer blocks of styrene. The B blocks prior to hydrogenation are polymer blocks of 1,3-butadiene, where between about 25 and 60 percent of the units have a 1,2-vinyl bond content, preferably between about 30 and about 55 1,2-vinyl bond content. The control of microstructure in the synthesis of the polymer is through the addition of a control agent during polymerization of the butadiene. A typical agent is diethyl ether. See U.S. Pat. No. Re 27,145 and U.S. Pat. No. 5,777,031, the disclosure of which is hereby incorporated by reference.

The tetrablock copolymer is selectively hydrogenated using any of the several hydrogenation processes know in the art. For example the hydrogenation may be accomplished using methods such as those taught, for example, in U.S. Pat. Nos. 3,494,942; 3,634,594; 3,670,054; 3,700,633; and U.S. Re. Pat. No. 27,145, the disclosures of which are hereby incorporated by reference. The methods known in the prior art and useful in the present invention for hydrogenating polymers containing ethylenic unsaturation and for selectively hydrogenating polymers containing aromatic and ethylenic unsaturation, involve the use of a suitable catalyst, particularly a catalyst or catalyst precursor comprising an iron group metal atom, particularly nickel or cobalt, and a suitable reducing agent such as an aluminum alkyl. Also useful are titanium based catalyst systems. In general, the hydrogenation will be accomplished in a suitable solvent at a temperature within the range from about 20° C. to about 100° C., and at a hydrogen partial pressure within the range from about 100 psig to about 5,000 psig. Catalyst concentrations within the range from about 10 ppm wt to about 500 ppm wt of iron group metal based on total solution are generally used and contacting at hydrogenation conditions is generally continued for a period of time with the range from about 60 to about 240 minutes. After the hydrogenation is completed, the hydrogenation catalyst and catalyst residue will, generally, be separated from the polymer.

An important aspect of the present tetrablock copolymer is control of the molecular weights of the individual blocks. This is accomplished by controlling the monomer and the initiator ratios according to known techniques. The following are the preferred and more preferred molecular weights of the blocks:

| Block | Preferred Range | More Preferred Range |
|---|---|---|
| $A_1$ | 6,000 to 8,000 | 6,500 to 7,250 |
| $B_1$ | 55,000 to 70,000 | 55,000 to 65,000 |
| $A_2$ | 7,500 to 9,000 | 8,000 to 9,000 |
| $B_2$ | 5,000 to 12,000 | 5,000 to 8,000 |

Molecular weights of linear block copolymers are conveniently measured by Gel Permeation Chromatography (GPC) in tetrahydrofuran, where the GPC system has been appropriately calibrated. Polymers of known molecular weight are used to calibrate the GPC and these must be of the same molecular structure and chemical composition as the unknown linear polymers that are to be measured.

Another important aspect of the tetrablock copolymers is the melt flow, measured at 200° C. and at 250° C. The measurement is according to ASTM D-1238. The melt flow for the neat polymer must be between 4.0 and 20.0 grams per 10 minutes as measured at 250° C. under a load of 5 kg, preferably between 5.0 and 15 grams per 10 minutes. In addition the melt flow must be less than 2.0 grams per 10 minutes as measured at 200° C. under a load of 5 kg, preferably under 1.5. These melt flow rates are important because they are measures of the rheological properties that control the balance of performance and processability for these polymers. Products that have melt flow rates at 200° C. greater than 2.0 grams per 10 minutes will have poor mechanical properties in the application. Products that have melt flow rates at 250° C. that are less than 4.0 grams per 10 minutes will be difficult to melt fabricate into a useful article. Preparing polymers having the desired melt flow rates will allow the preparation of compounds having good melt processing characteristics and excellent performance in the final fabricated article.

Still further, the order-disorder temperature (ODT) must be less than 240° C., preferably between 210° C. and 240° C. This is important because when the ODT is below 210° C. the polymer will exhibit excessive creep. Polymers with ODT's above 240° C. may not be easily formulated into effective elastic compounds with common ingredients. The order-disorder temperature is defined as the temperature above which a zero shear viscosity can be measured by capillary rheology or dynamic rheology.

As mentioned above, another aspect of the present invention relates to blends or compounds of the tetrablock copolymers of the present invention with other polymers selected from the group consisting of certain styrene polymers, certain olefin polymers, and certain tackifying resins.

The styrene polymers are selected from crystal polystyrene and anionic polystyrene, and are included to increase strength and modulus of the compound. High impact polystyrene is not useful because the rubber dispersed in the HIPS would reduce the strength of the compound. It is preferred that the anionic polystyrene have a molecular weight of about 5,000 to about 100,000, since lower molecular weights would be too volatile and higher molecular weights could be obtained as easily from commercial polymers. As for the crystal polystyrene, it is preferred that it have a melt flow greater than 8 and about 15. Preferred polystyrenes include anionic polystyrene having a molecular weight of 7,000, and crystal polystyrene having a melt flow of about 15. Suitable polystyrenes are available from many manufacturers such as Nova Chemicals.

The olefin polymers include both crystalline and elastomeric polyolefins. Polyolefins utilized in the present invention must be those that form a mechanically compatible blend when blended with the tetrablock copolymers of the present invention. The olefin polymer is added to the compound in order to increase the modulus (stiffness) of the compound and improve the flow properties. In particular, preferred olefin polymers include polyethylene, polypropylene, and polybutylene, including ethylene copolymers, propylene copolymers and butylene copolymers. Also useful are metallocene catalyzed olefin polymers, such as those available from Dow Chemical Company under the trademark AFFINITY or ENGAGE and from Exxon/Mobil Chemical Company under the trademark EXACT. Blends of two or more of the polyolefins may be utilized. Much preferred polyolefins include low density polyethylene and linear low density polyethylene having densities less than 0.93 grams per cubic centimeter. In addition it is preferred that the LDPE or LLDPE have a high melt flow, preferably greater than about 100. A much preferred polyolefin is Petrothene NA 601 from Quantum Chemical, having a density of about 0.903 grams per cubic centimeter and a Melt index of 2,000 grams per 10 minutes when measured in accordance with ASTM D 1238. Waxes, such as Epolenes, available from Eastman Chemical are also suitable polyolefins. The waxes may be branched ethylene waxes or copolymer waxes.

Various tackifying resins can be used in the present invention in order to increase tack and reduce viscosity. Any tackifying resin can be used which is compatible with the tetrablock copolymer and the polyolefin, and can withstand the processing temperatures. Generally, hydrogenated hydrocarbon resins are preferred tackifying resins, because of their better temperature stability. Suitable resins are available from a number of companies such as Arkon resins from Arakawa, Rextac from Huntsman Chemical, Escorez from Exxon Chemical and Estotac , Regalite, and Regalrez resins from Eastman. Preferred tackifying resins are hydrogenated α-methyl styrene, low molecular weight hydrocarbon resin, such as REGALREZ® resins 1126 and 1139 from Eastman Chemical.

The compounds of the present invention include those having the following formulations, where the total of the various components in any one formulation equals 100 percent:

| Component | Preferred Range, % w | More Preferred Range, % w |
|---|---|---|
| Tetrablock | 50 to 80% | 65 to 75% |
| Styrene Polymer | 4 to 15% | 5 to 10% |
| Olefin Polymer | 5 to 20% | 5 to 15% |
| Tackifying Resin | 0 to 25% | 10 to 25% |

While the principal components of the extrudable, elastomeric composition have been described in the foregoing, such composition is not limited thereto, and can include other components not adversely affecting the composition attaining the stated objectives. Exemplary materials which could be used as additional components would include, without limitation, pigments, antioxidants, stabilizers, surfactants, waxes, flow promoters, solvents, particulates, and materials added to enhance processability and handling of the composition.

Any of the techniques known in the art for blending polymeric components may be used to combine the components of the composition of this invention. Suitable blending techniques include roll milling, screw extrusion and the like.

The compositions of the present invention may be used in a variety of applications such as molded and extruded goods. Preferred applications are overmolding on various polymer substrates and extrusion into elastic films and fibers having improved processing and/or bonding properties. Molded products provide a soft, high friction surface either alone or overmolded onto polymer substrates to improve the surface feel of a wide range, of products.

The following examples are intended to be illustrative only, and are not intended to be, nor should they be construed as being, limiting in any way of the scope of the present invention.

Illustrative Embodiment #1

In Illustrative Embodiment #1 various tetrablock copolymers were prepared—some according to the present invention, and some outside the present invention. In all cases the tetrablock copolymers were prepared according to the following process scheme:

1. In the first step styrene was polymerized in a reactor in the presence of a cyclohexane diluent and a sec-butyl lithium initiator to form the $A_1$ block;
2. in the second step, 1,3-butadiene was added to the reactor along with diethyl ether as a microstructure modifier to form the $B_1$ block;
3. in the third step styrene was added to form the $A_2$ block;
4. in the fourth step 1,3-butadiene was added to form the $B_2$ block;
5. methanol was then added to terminate the polymerization;
6. the resulting $A_1$-$B_1$-$A_2$-$B_2$ polymer was then hydrogenated under standard conditions with a nickel octoate/ aluminum triethyl catalyst to selectively hydrogenate the butadiene units. The residual unsaturation of the olefin portion of the block copolymer was under 0.3 millequivalents per gram, equivalent to a conversion of over 95% of the olefin unsaturation.

The 1,2-vinyl content of the butadiene blocks prior to hydrogenation was about 38% for all the polymers.

The various polymers prepared in Illustrative Embodiment #1 are listed in Table #1. The polymers marked with an asterisk are those according to the present invention.—those not marked with an asterisk are outside the present invention.

Illustrative Embodiment #2

In Illustrative Embodiment #2 Polymer 1000 from Illustrative Embodiment #1 was compounded with varying amounts and types of polystyrene. The various polystyrenes tested include:

PS 6700, an anionic polystyrene having a molecular weight of 6700

Nova 555, a crystal polystyrene having a melt flow of 15

PS 15000, an anionic polystyrene having a molecular weight of 15,000

Nova EA 3000, a crystal polystyrene having a melt flow of 1.5

In all cases the compound contained 0.2 percent of an antioxidant.

It is well known in the industry that high molecular weight polystyrene is not effective in improving the properties of block copolymers because it does not interact with the polystyrene domains of the block copolymers. With the polymer of the present invention, however, the inventors have found that the addition of 5% to 10% polystyrene provides a very large improvement in tensile strength and 500% modulus. Table 2 and FIG. 1 details the formulations and properties of various compounds. These compounds were melt mixed in a small Brabender mixing head at 225° C. for 5 minutes. The resulting mixture was removed and compression molded into a film for testing. Table 2 and FIG. 1 show that the addition of 5% to 10% polystyrene produces a significant improvement in tensile strength, but more importantly in the modulus values at 300% and 500% strain. This provides the compound with a more linear stress strain curve and less of a rubbery plateau from 150–500% elongation. Typical block copolymers have a relatively slow increase in stiffness from 150–500% elongation. This slow increase in stiffness allows typical block copolymers to be stretched to high elongation without the use of significantly greater forces. In injection molded parts, the stiffer elastomer will provide better tear and bite resistance.

Illustrative Embodiment #3

Figure 2:
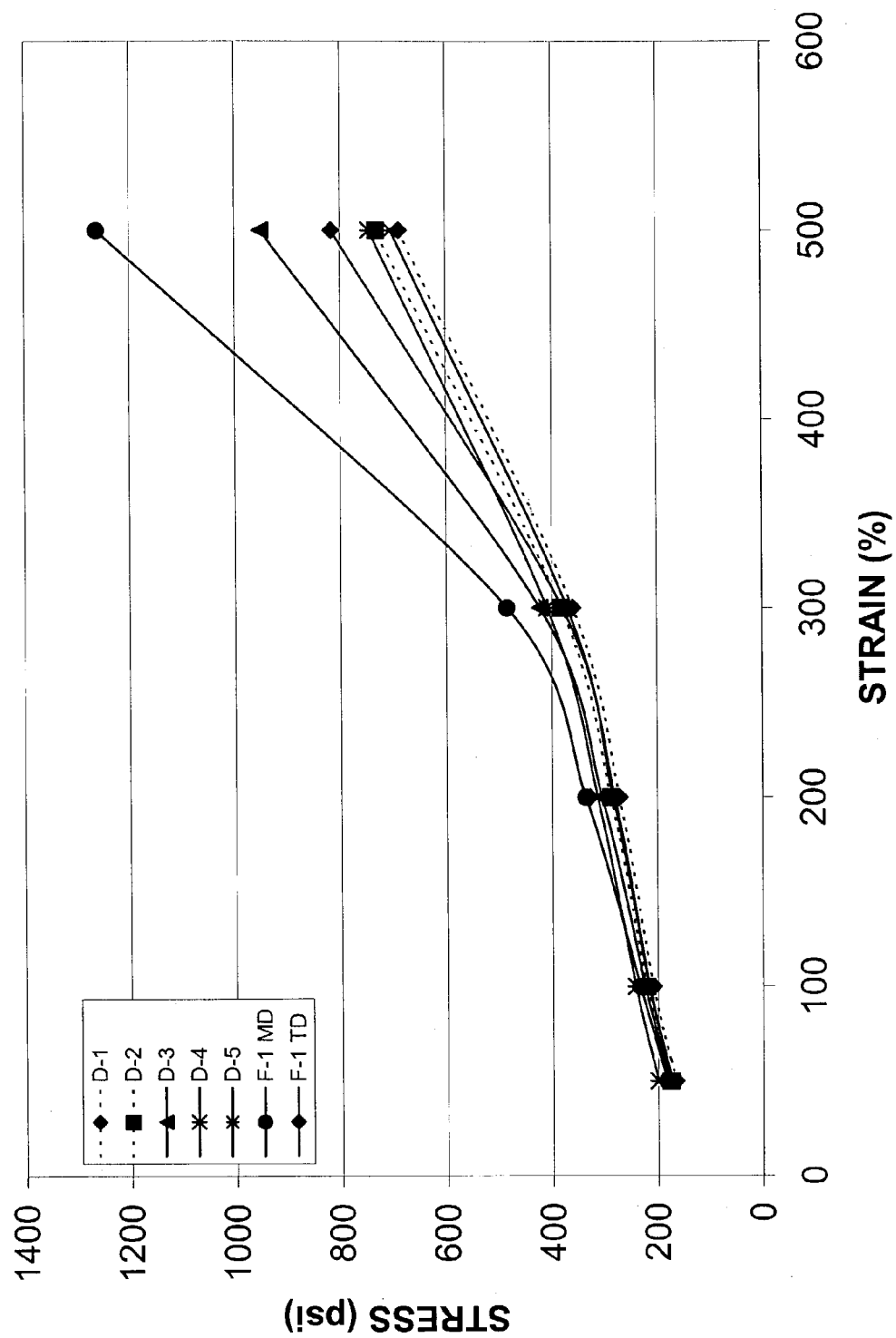
FIG. 2 shows stress-strain curves for various compounds of the present invention, including tetrablock copolymer, polystyrene, polyethylene and tackifying resin.

In Illustrative Embodiment #3 Polymer 1000 from Illustrative Embodiment #1 was compounded with a tackifying resin and a low-density polyethylene. The tackifying resin was Regalrez 1126, which is a fully hydrogenated a-methyl styrene hydrocarbon resin having a softening point of 125° C. The low-density polyethylene was NA-601, having a density of 0.903. Samples D-1 through D-5 were compounded in a similar manner to that of Illustrative Embodiment #2. The benefit of increased strength and modulus can be see from Table #3 and FIG. 2. Sample D-3, which contains polystyrene, tackifying resin and polyethylene has a substantially improved tensile strength and modulus at 500% elongation over any of the other formulations, without sacrificing other properties such as permanent set and hysteresis.

The formulation of Sample D-3 was compounded in larger volumes on a Berstorff twin screw extruder, then cast on a Davis Standard cast film line. The formulation is labeled F-1 in Table 3 and FIG. 2. The film version has substantially improved tensile strength and modulus at high elongations compared to formulations without polystyrene. The improvement is particularly noted in the machine direction ("md") of the extruded film, compared to the transverse ("td") direction. For applications where elongation is in the machine direction, such as fibers and some films, this is highly advantageous. The properties shown in Table 3 are relatively isotropic compared to traditional compounds where the difference in properties between the MD and TD directions is often more than a factor of 2. This is advantageous for molding thin parts with long flow paths. A material such as the F-1 compound would show very little tendency to warp or shrink non-uniformly because the properties are very similar in all directions.

Illustrative Embodiment #4

In Illustrative Embodiment #4 formulation F-1 from Illustrative Embodiment #3 is compared with other similar formulations with varying amounts of polymer and other ingredients. As shown in Table #4 the variation in tackifying level and polystyrene level results in materials which can have a range of modulus and surface tack without losing their high strength. Table 4 shows that this formulation can be very tacky and can be adjusted as desired.

Figure 3:
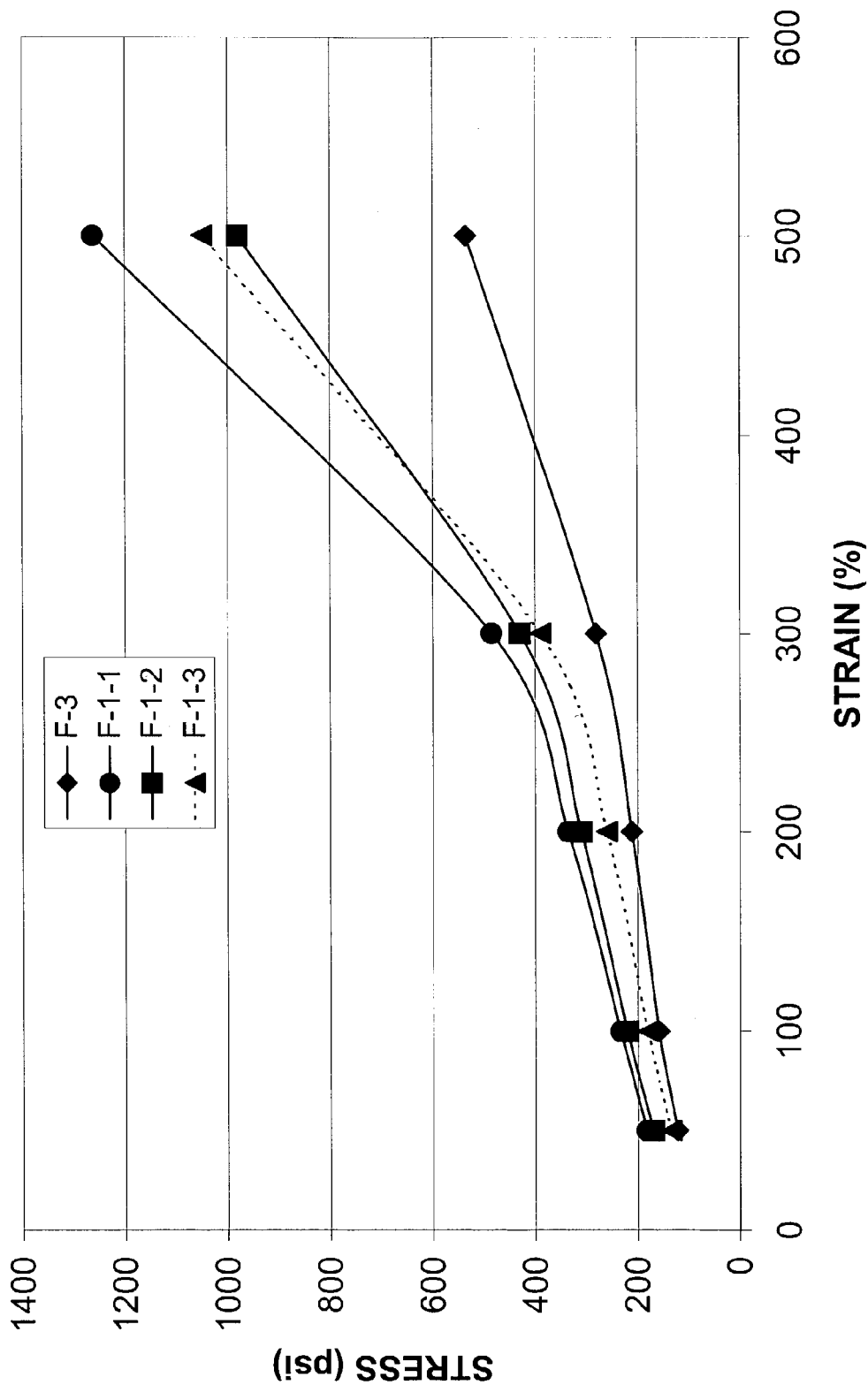
FIG. 3 shows stress-strain curves comparing compounds of the present invention against a compound based on a selectively hydrogenated styrene-isoprene tetrablock copolymer.

In addition, formulations with KRATON™ polymers G-1657 and G-1730 were prepared in a similar manner to the F-1 formulation, and the particular formulations are shown in Table 5. G-1657 is a selectively hydrogenated SBS block copolymer having a styrene content of about 13% w and also containing about 30% uncoupled diblock copolymer. G-1730 is a selectively hydrogenated S-I-S-I tetrablockcopolymer having a styrene content of about 22% w. As shown by comparing the results in Tables 4 and 5 and in FIG. 3, the ultimate tensile strength of the current invention is substantially improved over the existing commercial compounds. The modulus at all elongation levels is improved resulting in a more powerful elastic.

TABLE #1

Tetrablock Copolymers-Block Sizes, Melt Flow and Order-Disorder Temperatures

| Polymer | Actual Block Size (×1000) | | | | Melt flow | | ODT (° C.) |
|---|---|---|---|---|---|---|---|
| | $A_1$ | $EB_1$ | $A_2$ | $EB_2$ | @ 250° C. | @ 200° C. | |
| 1000* | 6.7 | 65.2 | 8.4 | 6.7 | 5.0 | 0.5 | 210 |
| 1001* | 6.8 | 59.2 | 8.1 | 6.6 | 8.4 | | 210 |
| 1002* | 6.9 | 61.0 | 8.4 | 6.6 | 8.4 | | 220 |
| 1003 | 23.4 | 83.4 | 25.0 | 8.8 | | | 300+ |
| 1004 | 27.0 | 90.4 | 27.4 | 12.1 | | | 300+ |
| 1005 | 21.4 | 83.5 | 28.7 | 11.0 | | | 300+ |
| 1006 | 7.4 | 67.7 | 9.6 | 6.9 | 2.0 | | 250 |
| 1007 | 7.3 | 65.8 | 9.2 | 7.7 | 2.9 | | 240 |
| 1008 | 7.4 | 64.8 | 9.1 | 6.7 | 2.9 | | 240 |
| 1009 | 6.7 | 59.2 | 8.6 | 7.3 | 5.0 | | 240 |
| 1010 | 6.8 | 58.4 | 8.6 | 6.5 | 7.0 | 0.7 | 240 |
| B-6 | 6.6 | 66.1 | 9.5 | 6.6 | 4.7 | | 250 |
| B-7 | 6.9 | 60.7 | 9.5 | 6.0 | 5.3 | | 240 |
| B-8* | 6.9 | 60.3 | 8.9 | 5.8 | 9.5 | 0.7 | 230 |
| B-9* | 6.8 | 59.4 | | | 14.3 | 1.7 | 210 |
| B-10* | 6.8 | 59.9 | 7.8 | 6.3 | 12.8 | 1.3 | 210 |
| B-11* | 6.8 | 59.7 | 8.8 | 5.8 | 7.7 | | 230 |
| B-12* | 6.8 | 60.6 | 8.2 | 6.1 | 9.4 | 1.1 | 230 |

TABLE #2

| Sample No. | D11 | D12 | D13 | D17 | D14 | D15 | D16 | D18 |
|---|---|---|---|---|---|---|---|---|
| Formulation | | | | | | | | |
| 1000, % | 99 | 95 | 90 | 95 | 99 | 95 | 90 | 95 |
| PS 6700, % | 1 | 5 | 10 | 0 | 0 | 0 | 0 | 0 |
| Nova 555, % | 0 | 0 | 0 | 0 | 1 | 5 | 10 | 0 |
| PS 1500, % | 0 | 0 | 0 | 5 | 0 | 0 | 0 | 0 |
| EA 3000, % | 0 | 0 | 0 | 0 | 0 | 0 | 0 | 5 |
| Properties Stress-Strain | | | | | | | | |
| Max Stress, psi | 4792 | 5561 | 5433 | 5773 | 4896 | 5734 | 6035 | 5719 |
| Strain at Break, % | 921 | 915 | 843 | 882 | 989 | 905 | 860 | 877 |
| Stress at 50%, psi | 172 | 151 | 183 | 165 | 159 | 165 | 179 | 170 |
| Stress at 100%, psi | 218 | 193 | 241 | 212 | 203 | 209 | 229 | 216 |
| Stress at 200%, psi | 290 | 264 | 342 | 286 | 271 | 286 | 324 | 301 |
| Stress at 300%, psi | 392 | 362 | 482 | 398 | 364 | 402 | 472 | 426 |
| Stress at 500%, psi | 799 | 806 | 1176 | 921 | 713 | 919 | 1249 | 1059 |
| ODT (° C.) | 210–260 | >280 | >280 | 200–280 | 200–260 | 200–280 | >280 | 200–280 |

TABLE #3

| Sample No. | D1 | D2 | D3 | D4 | D5 | F-1 | F-1 |
|---|---|---|---|---|---|---|---|
| 1000, % | 68 | 80 | 75 | 63 | 74 | 75 | 75 |
| PE 601, % | 12 | 7 | 7 | 20 | 13 | 7 | 7 |
| Regalrez 1126, % | 20 | 13 | 13 | 17 | 13 | 13 | 13 |
| Nova 555, % | 0 | 0 | 5 | 0 | 0 | 5 | 5 |

| Properties | | | | | | | |
|---|---|---|---|---|---|---|---|
| | Stress-Strain | | | | | md | trans |
| Max Stress at Break, psi | 4461 | 4482 | 5648 | 4771 | 4758 | 5628 | 5834 |
| Strain at Break, % | 1019 | 1008 | 969 | 1064 | 1019 | 787 | 914 |
| Stress at 50%, psi | 166 | 176 | 179 | 199 | 173 | 182 | 176 |
| Stress at 100%, psi | 208 | 221 | 224 | 242 | 215 | 233 | 216 |
| Stress at 200%, psi | 272 | 288 | 305 | 313 | 281 | 336 | 284 |
| Stress at 300%, psi | 360 | 382 | 423 | 409 | 371 | 485 | 380 |
| Stress at 500%, psi | 688 | 732 | 951 | 745 | 704 | 1262 | 817 |
| ODT (° C.) | 225 | 230 | 240 | 225 | 240 | 240 | |

TABLE #4

| Sample No | F-1-1 | | F-1-2 | | F-1-3 |
|---|---|---|---|---|---|
| Polymer | 1000 | | 1000 | | 1000 |
| | Formulation | | | | |
| Polymer, % | 75 | | 68 | | 60 |
| PE 601, % | 7 | | 7 | | 7 |
| Reg. 1126, % | 13 | | 20 | | 23 |
| PS 555, % | 5 | | 5 | | 10 |
| Tack | Very slight | | Slightly tacky | | Tacky |

| Properties | | | | | |
|---|---|---|---|---|---|
| Stress-Strain | md | td | md | td | |
| Max Stress at Break, psi | 5628 | 5834 | 5700 | 5400 | 4360 |
| Strain at Break, % | 787 | 914 | 830 | 985 | 945 |
| Stress at 50%, psi | 182 | 176 | 170 | 140 | 135 |
| Stress at 100%, psi | 233 | 216 | 220 | 170 | 180 |
| Stress at 200%, psi | 336 | 284 | 310 | 230 | 260 |
| Stress at 300%, psi | 485 | 380 | 430 | 300 | 390 |
| Stress at 500%, psi | 1262 | 817 | 980 | 560 | 1050 |

TABLE #5

| Sample No | F-2 | | F-3 | | F-4 | |
|---|---|---|---|---|---|---|
| Polymer Type | G-1657 | | G-1730 | | G-1730 | |
| | Formulation | | | | | |
| Polymer, % | 63 | | 68 | | 80 | |
| PE 601, % | 20 | | 12 | | 7 | |
| Reg. 1126, % | 17 | | 20 | | 13 | |
| PS 555, % | 0 | | 0 | | 0 | |
| Tack | Very slight | | Very slight | | Very slight | |

| Properties | | | | | | |
|---|---|---|---|---|---|---|
| Stress-Strain | md | td | md | td | md | Td |
| Max Stress at Break, psi | 2037 | 2050 | 3213 | 1924 | 2100 | 1990 |
| Strain at Break, % | 1000 | 1066 | 888 | 787 | 930 | 900 |
| Stress at 50%, psi | 146 | | 122 | 106 | | |
| Stress at 100%, psi | 190 | 222 | 158 | 139 | 150 | 154 |
| Stress at 200%, psi | 236 | | 211 | 189 | | 276 |
| Stress at 300%, psi | 294 | | 281 | 255 | 270 | 554 |
| Stress at 500%, psi | 478 | | 535 | 498 | 563 | |

TABLE #5-continued

| Sample No | F-5 | | F-6 | |
|---|---|---|---|---|
| Polymer Type | G-1730 | | G-1730 | |
| | Formulation | | | |
| Polymer, % | 70 | | 85 | |
| PE 601, % | 30 | | 15 | |
| Reg. 1126, % | 0 | | 0 | |
| PS 555, % | 0 | | 0 | |
| Tack | Very slight | | Very slight | |

| Properties | | | | |
|---|---|---|---|---|
| Stress-Strain | Md | Td | Md | Td |
| Max Stress at Break, psi | 1970 | 1840 | 2485 | 2310 |
| Strain at Break, % | 795 | 788 | 830 | 800 |
| Stress at 50%, psi | | | | |
| Stress at 100%, psi | 330 | 284 | 263 | 260 |
| Stress at 200%, psi | | | | |
| Stress at 300%, psi | 520 | 520 | 485 | 480 |
| Stress at 500%, psi | 950 | 1020 | 1040 | 1020 |

What is claimed is:

1. An elastomeric composition comprising:
   a. about 50 to about 80 weight percent of a linear hydrogenated block copolymer consisting of four alternating blocks having the block arrangement of $A_1$-$B_1$-$A_2$-$B_2$ wherein:
      (i) each polymer block $B_1$ and $B_2$ comprises polymerized, hydrogenated butadiene monomer units in which at least 90% of the olefinically unsaturated double bonds contained in the unhydrogenated polymer block are hydrogenated, and in which the unhydrogenated polymer block have a 1,2-vinyl bond content of greater than 25% and less than 60%;
      (ii) each polymer block $A_1$ and $A_2$ comprises polymerized mono alkenyl arene monomer units;
      (iii) the number average molecular weights of the blocks are between 6,000 and 8,000 for the $A_1$ block, between 55,000 and 70,000 for the $B_1$ block, between 7,500 and 9,000 for the $A_2$ block and between 5,000 and 12,000 for the $B_2$ block; and
      (iv) wherein said linear hydrogenated block copolymer has an order-disorder temperature of less than 240° C., a melt flow rate of less than 2.0 g/10 minutes as measured at 200° C. under a load of 5kg in accordance with ASTM D1238 and a melt flow rate of between 4.0 and 20.0 g/10 minutes as measured at 250° C. under a load of 5kg in accordance with ASTM 1238D;
   b. about 4 to about 15 weight percent of a styrene polymer selected from the group consisting of crystal polystyrene and anionically polymerized polystyrene;
   c. about 5 to about 20 weight percent of an olefin polymer selected from the group consisting of ethylene polymers and copolymers, propylene polymers and copolymers, and butylene polymers and copolymers; and
   d. about 0 to about 25 weight percent of a tackifying resin.

2. The elastomeric composition of claim 1 wherein said mono alkenyl arene is styrene, and wherein the number avenge molecular weights of the blocks are between 6,550 and 7,250 for the $A_1$ block, between 55,000 and 65,000 for the $B_1$ block, between 8,000 and 9,000 for the $A_2$ block, and between 5,000 and 8,000 for the $B_2$ block.

3. The elastomeric composition of claim 2 wherein the melt flow rate at 250° C. under 5 kg load of said linear hydrogenated block copolymer is between 5 and 15 g/10 minutes and wherein said order-disorder temperature is between 210 and 240° C.

4. The elastomeric composition of claim 3 wherein the amount of linear hydrogenated block copolymer is between about 60 and 80 weight percent, the amount of styrene polymer is between about 5 and 10 weight percent, the amount of olefin polymer is between about 5 and 15 weight percent, and the amount of tackifying resin is between about 10 and 25 weight percent.

5. The elastomeric composition of claim 1 wherein said styrene polymer is selected from the group consisting of anionic polystyrene having a number average molecular weight of about 5,000 to about 100,000 and crystal polystyrene having a melt flow above 8 gm/10 min at 200° C. under 5 kg load.

6. The elastomeric composition of claim 5 wherein said styrene polymer is crystal polystyrene having a melt flow of about 15 gm/10 min at 200° C. under 5 kg load.

7. The elastomeric composition of claim 1 wherein said olefin polymer is selected from the group consisting of ethylene polymers and ethylene copolymers.

8. The elastomeric composition of claim 7 wherein said ethylene polymer is selected from the group consisting of low density polyethylene and linear low density polyethylene having a density less than 0.93 grams per cubic centimeter.

9. The elastomeric composition of claim 1 wherein said tackifying resin is a hydrogenated hydrocarbon resin.

10. The elastomeric composition of claim 9 wherein said tackifying resin is a hydrogenated α-methyl styrene resin.

11. The elastomeric composition of claim 1 also containing one or more additives selected from the group consisting of uv stabilizers, antioxidants, optical brighteners and pigments.

12. A film extruded from the elastomeric composition of claim 1.

13. A fiber extruded from the elastomeric composition of claim 1.

14. The elastomeric composition of claim 1 where the polyolefin is a polypropylene polymer or copolymer.

15. An injection molded article prepared from the elastomeric composition of claim 1.

16. A linear hydrogenated block copolymer consisting of four alternating blocks having the block arrangement of $A_1$-$B_1$-$A_2$-$B_2$ wherein:
   a. each polymer block $B_1$ and $B_2$ comprises polymerized, hydrogenated butadiene monomer units in which at least 90% of the olefinically unsaturated double bonds contained in the unhydrogenated polymer block are hydrogenated, and in which the unhydrogenated polymer block have a 1,2-vinyl bond content of greater than 25% and less than 60%;
   b. each polymer block $A_1$ and $A_2$ comprises polymerized styrene monomer units;
   c. the number average molecular weights of the blocks are between 6,550 and 7,250 for the $A_1$ block, between 55,000 and 65,000 for the $B_1$ block, between 8,000 and 9,000 for the $A_2$ block and between 5,000 and 8,000 for the $B_2$ block; and
   d. wherein said linear hydrogenated block copolymer has an order-disorder temperature of less than 240° C., a melt flow rate of less than 2.0 g/10 minutes as measured at 200° C. under a load of 5 kg in accordance with ASTM D1238 and a melt flow rate of between 4.0 and 20.0 g/10 minutes as measured at 250° C. under a load of 5 kg in accordance with ASTM 1238D.

17. The linear hydrogenated block copolymer of claim 16 wherein the melt flow rate at 250° C. under 5 kg load is between 5 and 15 g/10 minutes.

18. The linear hydrogenated block copolymer of claim 17 wherein said order-disorder temperature is between 210 and 240° C.

19. The linear hydrogenated block copolymer of claim 17 wherein the 1,2-vinyl bond content of the unhydrogenated butadiene blocks is between 30% and 55%.

20. An elastomeric composition comprising:
   a. 50 to 80 weight percent of the linear hydrogenated block copolymer as claimed in claim 16;
   b. 4 to 15 weight percent of a styrene polymer selected from crystal polystyrene and anionically polymerized polystyrene;
   c. 5 to 20 weight percent of an olefin polymer selected from ethylene polymers and copolymers, propylene polymers and copolymers, and butylene polymers and copolymers; and
   d. 0 to 25 weight percent of a tackifying resin.

21. A film or fiber or an injection molded article prepared from the elastomeric composition of claim 20.

* * * * *